United States Patent
Mula et al.

(10) Patent No.: US 11,336,383 B2
(45) Date of Patent: May 17, 2022

(54) PACKET SCHEDULING SYSTEM WITH DESIRED PHYSICAL TRANSMISSION TIME FOR PACKETS

(71) Applicant: MELLANOX TECHNOLOGIES, LTD., Yokneam (IL)

(72) Inventors: Liron Mula, Ramat Gan (IL); Dotan David Levi, Kiryat Motzkin (IL); Ran Ravid, Tel Aviv (IL); Guy Lederman, Rishon Lezion (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 16/910,193

(22) Filed: Jun. 24, 2020

(65) Prior Publication Data

US 2021/0409137 A1 Dec. 30, 2021

(51) Int. Cl.
*H04J 3/06* (2006.01)
*H04L 12/46* (2006.01)
(Continued)

(52) U.S. Cl.
CPC ........ *H04J 3/0667* (2013.01); *H04L 12/4633* (2013.01); *H04L 43/0852* (2013.01); *H04L 69/22* (2013.01)

(58) Field of Classification Search
None
See application file for complete search history.

(56) References Cited

U.S. PATENT DOCUMENTS

| 6,212,197 | B1 | 4/2001 | Christensen et al. |
| 6,564,267 | B1 | 5/2003 | Lindsay |

(Continued)

FOREIGN PATENT DOCUMENTS

| AU | 2012216611 B2 | 3/2013 |
| CN | 103354989 A | 10/2013 |

(Continued)

OTHER PUBLICATIONS

IEEE Standard 1588-2008, "IEEE Standard for a Precision Clock Synchronization Protocol for Networked Measurement and Control Systems", pp. 1-289, year 2008.

Weibel et al., "Implementation and Performance of Time Stamping Techniques", 2004 Conference on IEEE 1588, pp. 1-29, Sep. 28, 2004.

(Continued)

*Primary Examiner* — Christine T Duong
(74) *Attorney, Agent, or Firm* — Kligler & Associates Patent Attorneys Ltd

(57) ABSTRACT

In certain exemplary embodiments, a switching device is provided, including an input interface configured to communicate with a packet source, an output interface configured to communicate with a packet destination, and packet processing circuitry. The packet processing circuitry is configured to receive a plurality of packets from the packet source via the input interface, each of the plurality of packets being associated with a packet descriptor, at least one of the packet descriptors being a transmission time packet descriptor including a desired physical transmission time for the packet associated with the transmission time packet descriptor, to receive an indication of a clock time, and for each packet associated with a transmission time packet descriptor, to physically transmit the packet associated with the transmission time packet descriptor, via the output interface, at a clock time corresponding to the desired physical transmission time. Related apparatus an methods are also provided.

16 Claims, 6 Drawing Sheets

(51) Int. Cl.
*H04L 43/0852* (2022.01)
*H04L 69/22* (2022.01)

(56) References Cited

U.S. PATENT DOCUMENTS

| | | | |
|---|---|---|---|
| 6,816,492 | B1 | 11/2004 | Turner et al. |
| 6,954,432 | B1 | 10/2005 | Bychowsky et al. |
| 7,224,669 | B2 | 5/2007 | Kagan et al. |
| 7,245,627 | B2 | 7/2007 | Goldenberg et al. |
| 7,676,597 | B2 | 3/2010 | Kagan et al. |
| 8,370,675 | B2 | 2/2013 | Kagan |
| 9,390,056 | B1 | 7/2016 | Noureddine et al. |
| 9,397,960 | B2 | 7/2016 | Arad et al. |
| 9,450,846 | B1* | 9/2016 | Huang ............... H04L 43/0864 |
| 9,667,446 | B2 | 5/2017 | Worrell |
| 10,027,601 | B2 | 7/2018 | Narkis et al. |
| 10,187,400 | B1 | 1/2019 | Castro et al. |
| 10,284,383 | B2 | 5/2019 | Bloch et al. |
| 10,320,508 | B2 | 6/2019 | Shimizu et al. |
| 10,727,966 | B1 | 7/2020 | Izenberg et al. |
| 2003/0002483 | A1 | 1/2003 | Zwack |
| 2004/0174820 | A1 | 9/2004 | Ricciulli |
| 2006/0153179 | A1 | 7/2006 | Ho et al. |
| 2008/0298380 | A1* | 12/2008 | Rittmeyer ............ H04L 47/245 370/412 |
| 2012/0201248 | A1 | 8/2012 | Aoki |
| 2014/0379714 | A1 | 12/2014 | Hankins |
| 2015/0046741 | A1 | 2/2015 | Yen et al. |
| 2015/0055508 | A1 | 2/2015 | Ashida et al. |
| 2015/0318015 | A1 | 11/2015 | Bose et al. |
| 2017/0171362 | A1 | 6/2017 | Bolotov et al. |
| 2017/0331926 | A1 | 11/2017 | Raveh et al. |
| 2018/0124812 | A1 | 5/2018 | Thubert et al. |
| 2018/0191629 | A1 | 7/2018 | Biederman et al. |
| 2019/0056972 | A1 | 2/2019 | Zhou et al. |
| 2019/0124524 | A1 | 4/2019 | Gormley |
| 2019/0319730 | A1 | 10/2019 | Webb et al. |
| 2019/0379714 | A1 | 12/2019 | Levi et al. |
| 2020/0252320 | A1* | 8/2020 | Zemach ................ H04L 63/123 |

FOREIGN PATENT DOCUMENTS

| | | |
|---|---|---|
| EP | 0607412 B1 | 1/1999 |
| JP | 2005529523 A | 9/2005 |
| JP | 2007042145 A | 2/2007 |
| WO | 9418627 A2 | 8/1994 |
| WO | 9857497 A1 | 12/1998 |
| WO | 2001037489 A1 | 5/2001 |

OTHER PUBLICATIONS

InfiniBandTM Architecture Specification vol. 1, Release 1.2.1, pp. 1-1727, Nov. 2007.
Lu et al., "A Fast CRC Update Implementation", Computer Engineering Laboratory, Electrical Engineering Department, pp. 113-120, Oct. 8, 2003.
Mellette et al., "Toward Optical Switching in the Data Center", IEEE 19th International Conference on High Performance Switching and Routing (HPSR), pp. 1-6, Bucharest, Romania, Jun. 18-20, 2018.
Bakopoulos et al., "NEPHELE: an end-to-end scalable and dynamically reconfigurable optical architecture for application-aware SDN cloud datacenters", IEEE Communications Magazine, vol. 56, issue 2, pp. 1-26, Feb. 2018.
O-RAN Alliance, "O-RAN Fronthaul Working Group; Control, User and Synchronization Plane Specification", ORAN-WG4 CUS. 0-v01.00, Technical Specification, pp. 1-189, year 2019.
Vattikonda et al., "Practical TDMA for Datacenter Ethernet", EuroSys conference, Bern, Switzerland, pp. 225-238, Apr. 10-13, 2012.
Ericsson AB et al., "Common Public Radio Interface: eCPRI Interface Specification", V2.0, pp. 1-109, May 10, 2019.
Xilinx Inc., "Radio over Ethernet Framer v2.1", PB056 (v2.1), pp. 1-9, Oct. 30, 2019.
Weibel, H., "High Precision Clock Synchronization according to IEEE 1588 Implementation and Performance Issues", Zurich University of Applied Sciences, pp. 1-9, Jan. 17, 2005.
Sanchez-Palencia, J., "[RFC,v3,net-next,00/18] Time based packet transmission", pp. 1-14, Mar. 7, 2018.
IEEE Std 802.1Qaz™, "IEEE Standard for Local and metropolitan area networks—Media Access Control (MAC) Bridges and Virtual Bridged Local Area Networks—Amendment 18: Enhanced Transmission Selection tor Bandwidth Sharing Between Traffic Classes", IEEE Computer Society, pp. 1-110, Sep. 30, 2011.
Crupnicoff et al., "Deploying Quality of Service and Congestion Control in InfiniBand-based Data Center Networks" White Paper, Mellanox Technologies Inc, Rev 1.0, pp. 1-19, Oct. 15, 2005.
Mathey et al., "Scalable Deadlock-Free Deterministic Minimal-Path Routing Engine for InfiniBand-Based Dragonfly Networks", IEEE Transactions on Parallel and Distributed Systems, vol. 29, No. 1, pp. 183-197, Jan. 2018.
Wikipedia,"Precision Time Protocol", pp. 1-9, Apr. 20, 2020.
SMPTE Standard, "Professional Media Over Managed IP Networks:Traffic Shaping and Delivery Timing for Video", The Society of Motion Picture and Television Engineers, pp. 1-17, Nov. 22, 2017.
Wikipedia, "Time-Sensitive Networking", pp. 1-12, Mar. 5, 2020.
Levi et al., U.S. Appl. No. 16/782,075, filed Feb. 5, 2020.
Levi et al., U.S. Appl. No. 16/921,993, filed Jul. 7, 2020.
U.S. Appl. No. 16/782,075 Office Action dated Apr. 5, 2021.
Wills, "Network Time Protocol (Version 1): Specification and Implementation," RFC 1059, pp. 2-59, Jul. 1988.
Wills, "Internet Time Synchronization: The Network Time Protocol," IEEE Transactions on Communication, vol. 39, No. 10, pp. 1482-1493, Oct. 1991.
Wills, "Network Time Protocol (Version 3): Specification, Implementation and Analysis," RFC 1305, pp. 1-96, Mar. 1992.
Wills, "Network Time Protocol (NTP)," RFC 0958, pp. 2-15, Sep. 1985.
U.S. Appl. No. 16/782,075 Office Action dated Oct. 5, 2020.
EP Application # 21181591.5 Search Report dated Sep. 17, 2021.
Baboescu et al., "Scalable Packet Classification," Proceedings of SIGCOMM'01, ACM, pp. 199-210, year 2001.
Bader et al., "Survey and Comparison of Open Source Time Series Databases," BTW 2017, Workshopband, Lecture Notes in Informatics (LNI), Gesellschaft fuer Informatik, Bonn, pp. 249-268, year 2017.
Davie et al., "An Expedited Forwarding PHB (Per-Hop-Behavior)", RFC 3246, Network Working Group, pp. 1-32, Mar. 2002.
Yau et al., "Development of Situation-Aware Application Software for Ubiquitous Computing Environments," Proceedings of the 26th Annual International Computer Software and Applications Conference (COMSAC'02), IEEE Computer Society, pp. 1-6, year 2002.
U.S. Appl. No. 16/921,993 Office Action dated Dec. 22, 2021.

\* cited by examiner

PACKET SCHEDULING SYSTEM WITH DESIRED PHYSICAL TRANSMISSION TIME FOR PACKETS

FIELD OF THE INVENTION

The present invention, in certain embodiments thereof, relates to packet scheduling systems, and particularly but not exclusively to systems which schedule packet transmission time.

BACKGROUND OF THE INVENTION

In the opinion of the inventors of the present, packet transmission systems today often rely on a packet transmission methodology in which, once a packet is ready to be transmitted, the packet is transmitted (delivered, as described herein, to a physical layer for transmission) "as soon as possible". Other systems exist, such as that described in U.S. patent application Ser. No. 16/782,075 of Levi et al, filed 5 Feb. 2020.

SUMMARY OF THE INVENTION

The present invention, in certain exemplary embodiments thereof, seeks to provide an improved packet scheduling system.

The inventors of the present invention believe that it would be desirable to provide a system in which the time at which a packet is transmitted (delivered to a physical layer, sometimes referred to colloquially as "a wire" for transmission) is known. This can be helpful in knowing when a packet will be delivered, because in some cases the time of propagation on the wire is known. It may be helpful to know the time of transmission on the physical layer in advance; it may also be helpful to have the time of transmission shown inside a transmitted packet. Showing the time of transmission within a packet has been very difficult (in the opinion of the inventors of the present invention, in systems which existed before the present invention) because once a packet approaches/reaches a physical layer, it is generally no longer allowed to change contents of the packet, so that it would not be possible to alter a packet "at the last moment" to include the time of delivery to a physical layer.

In certain exemplary embodiments of the present invention, it may be desirable to show the time of transmission only in some packets, not in all packets; by way of non-limiting example, showing the time of transmission in less than all packets might be desirable due to performance consideration. Nevertheless, in certain exemplary embodiments of the present invention, it may be desirable to show the time of transmission in only one packet, in all packets, or in any appropriate number of packets.

Such scheduling as described above and herein may be very helpful in various networking fields. By way of non-limiting example, IEEE precision-time-protocol requires accurate timestamping of egressing packets. By way of another non-limiting example, high-resolution video feeds require very accurate packet transmission times for egressing packets; sending the first packet in each video frame at a very accurate transmission time is believed to be sufficient. It is noted generally that a video frame may comprise a large number of packets, such as 1,000 or 10,000 packets. Sending video frames as described in this paragraph may also be helpful in implementing systems compliant with the SMPTE 2110-21 standard.

The inventors of the present invention believe that it would not be practical to provide such accurate transmission time for each of (for example) millions of packets, since this would degrade the performance in the case of other packets. Furthermore, the inventors of the present invention believe that good results may be obtained by providing accurate transmission time for fewer than all packets; and also that by determining in advance when a packet will egress, and by delaying egress of the packet until that determined time, high accuracy can be obtained. Furthermore, the inventors of the present invention believe that there may be a tradeoff between transmitting a packet as soon as possible, and the desire or requirement to accurately timestamp a packet. Exemplary embodiments of the present invention describe a way of handling such a tradeoff which is believed to be different and unique compared to previous systems.

In addition, high bandwidth wireless communication in 5G networks, similarly to a high speed video interface, would send many packets to each of a plurality of phones; the packets sent to a given phone would be sent at a very specific time, after which packets would be sent to another given phone; if the first such packet for a given phone is sent at a very specific time, then the rest of the packets for that phone will follow shortly thereafter.

Furthermore, high bandwidth wireless communication in 5G networks generally requires back-units to send information to the radio network in very accurate time-slots. In order to send a packet in a very accurate time slot, a clock (such as, by way of non-limiting example, a UTC (universal coordinated time) clock or a TAI (international atomic time) clock) is introduced, in exemplary embodiments of the present invention, to the packet forwarding system.

In general, the inventors of the present invention believe that the closer this clock is to the physical interface on which packets are sent, the more accurate the timing of packet egress can be.

There is thus provided in accordance with an exemplary embodiment of the present invention a switching device, including an input interface configured to communicate with a packet source, an output interface configured to communicate with a packet destination, and packet processing circuitry, configured to receive a plurality of packets from the packet source via the input interface, each of the plurality of packets being associated with a packet descriptor, at least one of the packet descriptors being a transmission time packet descriptor including a desired physical transmission time for the packet associated with the transmission time packet descriptor, to receive an indication of a clock time, and for each packet associated with a transmission time packet descriptor, to physically transmit the packet associated with the transmission time packet descriptor, via the output interface, at a clock time corresponding to the desired physical transmission time.

Further in accordance with an exemplary embodiment of the present invention the input interface includes a host interface, and the packet source includes a host, and the output interface includes a network interface.

Still further in accordance with an exemplary embodiment of the present invention the input interface includes a first network interface, and the packet source includes a network source remote to the switching device, and the output interface includes a second network interface.

Additionally in accordance with an exemplary embodiment of the present invention the packet processing circuitry is also configured to hold one or more packets prior to transmission, the one or more packets being held including at least one packet associated with the transmission time packet descriptor, until the clock time corresponds to the desired physical transmission time.

Moreover in accordance with an exemplary embodiment of the present invention the switching device includes clock circuitry and master clock circuitry, and the clock circuitry is configured to provide one or more indications of clock time to the packet processing circuitry, and the master clock circuitry is configured periodically to correct the time provided by the clock circuitry.

Further in accordance with an exemplary embodiment of the present invention the master clock circuitry includes a PTP clock.

Still further in accordance with an exemplary embodiment of the present invention the indications of clock time provided by the clock circuitry are provided in PTP time format.

Additionally in accordance with an exemplary embodiment of the present invention the packet processing circuitry is also configured to hold one or more packets prior to transmission, the one or more packets being held including at least one packet associated with the transmission time packet descriptor, until the clock time as corrected by the master clock circuitry corresponds to the desired physical transmission time.

Moreover in accordance with an exemplary embodiment of the present invention at least the input interface, the output interface, and the packet processing circuitry are included in a switch.

Further in accordance with an exemplary embodiment of the present invention at least the input interface, the output interface, and the packet processing circuitry are included in a network adapter.

Still further in accordance with an exemplary embodiment of the present invention at least the input interface, the output interface, and the packet processing circuitry are included in a graphics processing unit.

There is also provided in accordance with another exemplary embodiment of the present invention a method for packet scheduling, the method including performing the following in packet processing circuitry: receiving a plurality of packets from a packet source via an input interface, the packet source being external to the packet processing circuitry, each of the plurality of packets being associated with a packet descriptor, at least one of the packet descriptors being a transmission time packet descriptor including a desired physical transmission time for the packet associated with the transmission time packet descriptor, receiving an indication of a clock time, and for each packet associated with a transmission time packet descriptor, physically transmitting the packet associated with the transmission time packet descriptor, via an output interface, at a clock time corresponding to the desired physical transmission time.

Further in accordance with an exemplary embodiment of the present invention the method also includes holding one or more packets prior to transmission, the one or more packets being held including at least one packet associated with the transmission time packet descriptor, until the clock time corresponds to the desired physical transmission time.

Still further in accordance with an exemplary embodiment of the present invention the method also includes receiving one or more indications of clock time from clock circuitry external to the packet processing circuitry, and the clock circuitry periodically receives time corrections from master clock circuitry external to the packet processing circuitry.

Additionally in accordance with an exemplary embodiment of the present invention the master clock circuitry includes a PTP clock.

Moreover in accordance with an exemplary embodiment of the present invention the indications of time received from the clock circuitry are provide in PTP time format.

Further in accordance with an exemplary embodiment of the present invention the holding one or more packets prior to transmission includes holding the one or more packets prior to transmission until the clock time corrected by the master clock circuitry corresponds to the desired physical time.

Still further in accordance with an exemplary embodiment of the present invention the method also includes holding one or more packets prior to transmission, the one or more packets being held including at least one packet associated with the transmission time packet descriptor, until the clock time as corrected by the master clock circuitry corresponds to the desired physical transmission time.

Additionally in accordance with an exemplary embodiment of the present invention the master clock circuitry is external to the clock circuitry.

There is also provided in accordance with another exemplary embodiment of the present invention apparatus including packet processing circuitry, configured to receive a packet from a packet source via an input interface, the packet being associated with a transmission time packet descriptor including a desired physical transmission time for the packet associated with the transmission time packet descriptor, to receive an indication of a clock time, and for the packet associated with the transmission time packet descriptor, to physically transmit the packet associated with the transmission time packet descriptor, via an output interface, at a clock time corresponding to the desired physical transmission time.

BRIEF DESCRIPTION OF THE DRAWINGS

The present invention will be understood and appreciated more fully from the following detailed description, taken in conjunction with the drawings in which.

DETAILED DESCRIPTION OF AN EMBODIMENT

Figure 1:
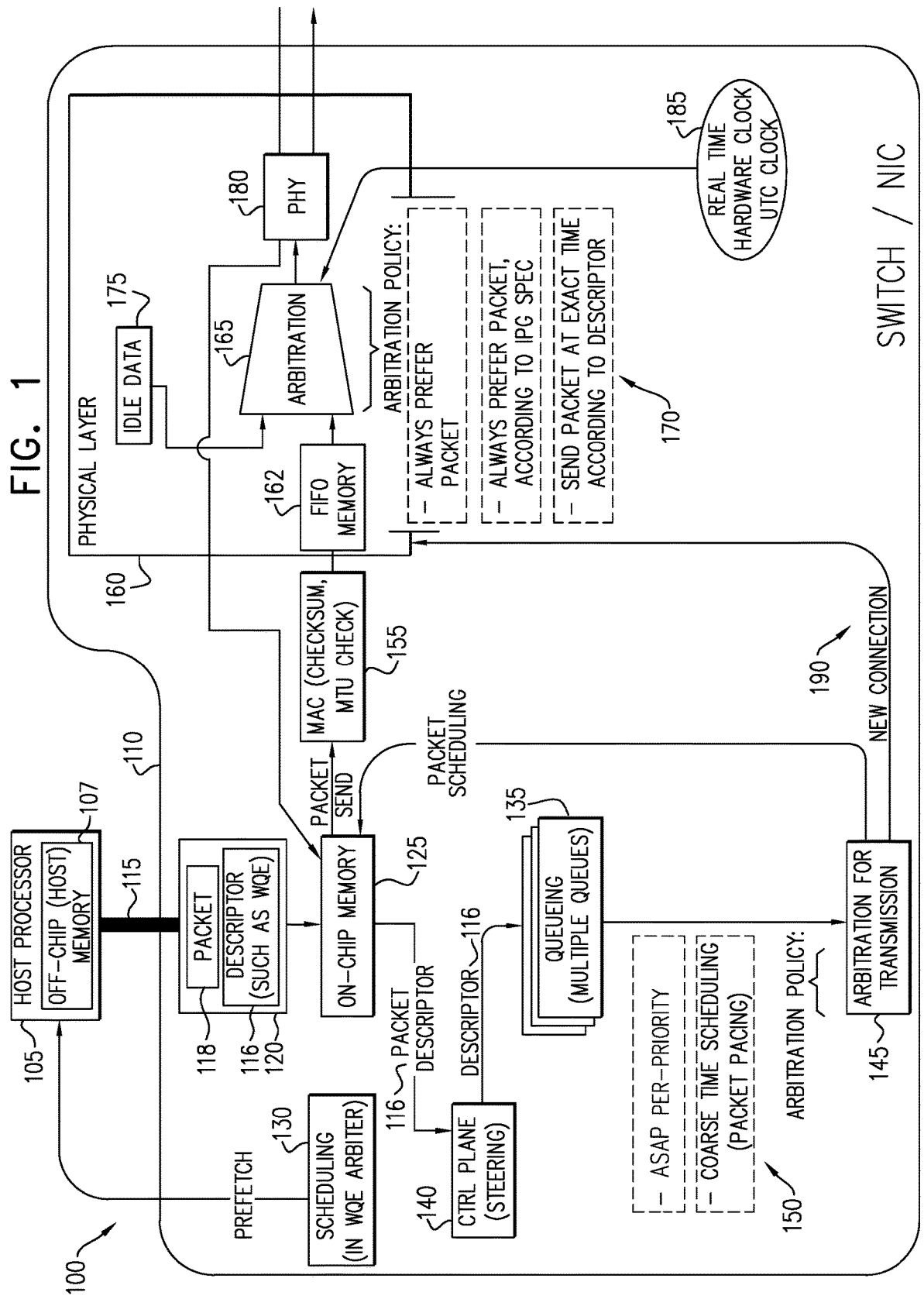
FIG. 1 is a simplified pictorial illustration of a packet scheduling system constructed and operative in accordance with an exemplary embodiment of the present invention.

Reference is now made to FIG. 1, which is a simplified pictorial illustration of a packet scheduling system constructed and operative in accordance with an exemplary embodiment of the present invention.

The system of FIG. 1, generally designated 100, comprises the following:

a host processor 105, which may comprise any appropriate processor, such as, for example, a processor of a general-purpose computer; and a switching device, which is shown in FIG. 1 for the sake of simplicity of depiction as a switch or NIC (network interface controller) 110. It is appreciated that another switching device, other than a switch or NIC (such as, by way of non-limiting example, a specialized processing device or a graphics processing unit (GPU)) may be used instead of the switch or NIC 110, provided that the other switching device performs or is configured to perform the operations herein described with reference to the switch or NIC 110.

A subcombination of the various elements comprised in the switch or NIC 110, not including portions which are used (as described below) for input of packets to the switch or NIC 110, or for output of packets therefrom, is also termed herein "packet processing circuitry". Such packet processing circuitry, without any other components of the switch or NIC 110, may comprise an exemplary embodiment of the present invention.

Without limiting the generality of exemplary embodiments of the present invention, the example of a NIC 110 will generally be described herein. A NIC may also be termed herein a "network adapter".

Without limiting the generality of exemplary embodiments of the present invention, a host processor 105 is depicted and described by way of example only. Functions relating to packet processing, described below with reference to the NIC 110, may take place on packets received other than from the host processor 105 such as, by way of non-limiting example, from a network.

Further exemplary details of the structure and operation of the system 100 are now briefly described.

As in conventional packet processing/scheduling systems, packets which originate in the host processor 105, and which are stored in an off-chip (host) memory 107 thereof, may be sent to a destination via the NIC 110; and packets originating at a destination may be sent to the host processor 105 via the NIC 110. Details of structure and functioning of the system of FIG. 1, which extend beyond conventional packet processing/scheduling systems, are described in more detail below. In general, packet processing may take place in accordance with any of a number of well-known packet processing specifications such as, by way of non-limiting example, InfiniBand®; Ethernet; and PCIx or PCIe.

The host processor 105 may comprise any appropriate processor, such as a processor comprised in a general purpose or other computer system (not shown). It will be appreciated that a subcombination comprising the NIC 110 (without the host processor 105) may comprise an alternative exemplary embodiment of the present invention.

In exemplary embodiments, most or all elements of the NIC 110 shown and described with reference to FIG. 1 are implemented on a single IC chip, although this is not necessarily the case, as multiple IC chips and other components may be used. For the sake of simplicity of depiction and description, such elements are described as "on-chip"; such depiction and description is not meant to be limiting.

The host processor 105 of FIG. 1 is connected to and in communication with the NIC 110 via a bus 115. The bus 115 may comprise any appropriate bus providing communication between the host processor 105 and the NIC 110 such as, by way of non-limiting example, a PCIe bus.

Without limiting the generality of exemplary embodiments of the present invention, the bus 115 is shown and described by way of example only. In general, any appropriate input interface may be used in place of the bus 115. By way of non-limiting example, in an embodiment where a network is used (as a source of packets, as described below and above) instead of the host 105, the input interface would comprise any appropriate network interface.

The host processor 105 sends a packet 116 and an accompanying descriptor 118 (by way of non-limiting example in an InfiniBand® system, the accompanying descriptor 118 would be a work queue entry (WQE)) from the off-chip memory 107 via the bus 115 to the NIC 110, where the packet 116 and the accompanying descriptor 118 are stored in an on-chip memory 125.

The packet 116 and the accompanying descriptor 118 are also collectively shown in FIG. 1 and given reference number 120.

It is appreciated that in certain exemplary embodiments a descriptor 116 is first sent to the NIC 110 and stored in the on-chip memory 125. Only later, when a packet associated with the descriptor 116 is to be sent, the packet 118 is fetched by or sent to the NIC 110. In such a case, a scheduling module 130 within the NIC 110 is responsible for causing fetch or prefetch of the packet 118 to the NIC 110. In exemplary embodiments the scheduling module 130 may be disposed in a control plane 140, described immediately below; in some exemplary embodiments, the scheduling module 130 may be termed or may comprise a "WQE arbiter". Further in some exemplary embodiments, the WQE arbiter as described may be comprised in an arbitration for transmission module 145, described below. In other exemplary embodiments, the WQE arbiter may be comprised in a queueing module 135, described below.

A given packet descriptor 116 passes to a control plane 140, and is then queued in a queueing module 135. In exemplary embodiments, the queuing module 135 supports multiple queues. An advantage of supporting multiple queues is that (as is well known, for example, in the case of InfiniBand) an operation of WQE prefetch is not strictly ordered, in that it is not known whether packets will arrive for sending in the same order that corresponding WQEs were queued. Multiple WQE queues may, for example, be arranged by application running on the host processor 105, with one WQE queue per application; the WQE arbiter can choose, from a given queue, a WQE for sending based on availability of a corresponding packet.

The control plane 140 is configured to perform various operations which may include, but not be limited to: address fix-up of addresses in a packet descriptor 116; encryption of all or part of packet data in a packet 118 pointed to by a packet descriptor 116 before sending; truncation of data in a packet 118 pointed to by a packet descriptor 116 before sending; and steering operations. Such operations are known in the art. The inventors of the present invention have realized that such operations (each of which may or may not take place in the case of a given packet) add unpredictability to the amount of time that is taken by a given packet to traverse the system 100 of FIG. 1 on the way to being sent; this unpredictability may motivate use of the present invention, in exemplary embodiments thereof. As shown in FIG. 1, a packet descriptor 116 is sent (whether changed or not as part of the operation of the control plane 140) to the queueing module 135.

In addition to the operations just described, the control plane 140 is configured to choose particular packets which are to be sent at an exact time (as described below) and to mark said packets, generally in a descriptor thereof, as described herein.

By way of non-limiting example, the following are descriptions of cases in which particular packets may be chosen by the control plane 140 for sending at an exact time:

1. IEEE precision-time-protocol requires accurate time-stamping of egressing packets; such egressing packets, which are sent in accordance with IEEE precision-time-protocol, would be chosen for sending at an exact time.

2. High-resolution video feeds require very accurate packet transmission times for egressing packets. Generally speaking, the first packet in a video frame would be chosen for sending at an exact time.

3. In addition, high bandwidth wireless communication in 5G networks, similarly to a high speed video interface, would send many packets to each of a plurality of phones; the packets sent to a given phone would be sent at a very specific time, after which packets would be sent to another given phone; if the first such packet for a given phone is sent at a very specific time, then the rest of the packets for that phone will follow shortly thereafter.

4. Furthermore, high bandwidth wireless communication in 5G networks generally requires back-units to send information to the radio network in very accurate time-slots. In order to send a packet in a very accurate time slot, a clock (such as, by way of non-limiting example, a UTC clock or a TAI clock) is introduced, in exemplary embodiments of the present invention, to the packet forwarding system.

In general, the inventors of the present invention believe that the closer (physically) this clock is to the physical interface on which packets are sent, the more accurate the timing of packet egress can be.

The inventors of the present invention believe that it would not be practical to provide such accurate transmission time for each of (for example) millions of packets, since this would degrade the performance in the case of other packets. Furthermore, the inventors of the present invention believe that good results may be obtained by providing accurate transmission time for fewer than all packets; and also that by determining in advance when a packet will egress, and by delaying egress of the packet until that determined time, high accuracy can be obtained.

It is appreciated that, in exemplary embodiments, the off-chip memory 107 may be asynchronous and may be engaged in various operations for the host processor 105, other than the operations described herein. At least for these reasons, the queueing function provided by the queueing module 135 is useful in order to provide smooth functioning of the NIC 110, to reduce any possibility that either starvation or overrun will occur.

The queueing module 135 determines, as described in more detail below, when a given packet is to be sent. Persons skilled in the art will appreciate that, once a packet and associated descriptor are in the on-chip memory 125, the time elapsed between the queueing module 135 making such a determination and the packet being sent outwards from the NIC 110 is somewhat predictable, again as described in more detail below.

When the queueing module determines that a given packet is to be sent, a descriptor (such as, by way of non-limiting example, a WQE) associated with the given packet is passed on to the arbitration for transmission module 145, which arbitrates when a given packet is actually sent. Such arbitration (shown as element 150 in FIG. 1) may be on the basis of: ASAP (a packet is sent as soon as possible) per priority (higher priority packets are sent before lower priority packets); or coarse time scheduling (packets are to be sent at approximately a given time). The basis just referred to is generally indicated in the descriptor, and arbitrated by the arbitration for transmission module 145. For example, a high priority packet might be sent sooner than a low priority packet; a packet to be sent based on coarse time scheduling might be sent close to that indicated time; and a (high priority) ASAP packet might be sent as soon as possible.

It is appreciated that, in accordance with what is described above, certain packets (such as those with lower priority) might in certain cases never be sent, because higher priority packets and/or packets to be sent based on coarse time scheduling might use all available sending capacity. In such a case, certain packets may be discarded, as is known in the art.

In general, the arbitration for transmission module 145 is operative to pick a packet to be sent from a plurality of queues; so that in the case of ASAP per priority, a packet is selected from the plurality of queues based on priority, and the selected packet is sent ASAP. A priority queues may, by way of non-limiting example, be maintained corresponding respectively to a plurality of applications running on the host processor 105.

By way of non-limiting example, the arbitration module may implement VL arbitration, as is known in InfiniBand® systems, or Enhanced Transmission Selection (ETS) in Ethernet systems, described for example in IEEE Std 802.1Qaz™-2011.

When a given packet is to be sent, the packet is sent from the on-chip memory 125 to a media access control (MAC) module 155. The MAC module 155 (among other tasks) makes sure that the packet has as proper beginning and end, is addressed to a proper address, appears to be of legal format, and the like, and adds a checksum to the packet. Such functions are well-known in the art.

The MAC module 155 sends packets onward to a physical layer 160, which may also be termed an "output interface" or a "network interface".

The physical layer 160 comprises:

a first-in first-out (FIFO) memory 162, which is configured to receive and store incoming packets, and to output those packets in a FIFO manner;

an arbitration module 165, which is configured to fetch packets from the FIFO memory 162, and to implement an arbitration policy 170 regarding the received packets as described below;

an idle data module 175, which produces idle data (bits) for sending when no actual packet data is to be sent, when required by an applicable specification related to a physical medium (described below);

a PHY module 180, which is configured: a) to place outgoing bits of a packet (or idle bits received by the idle data module 175) on a physical medium (not shown), such as a wire or any other appropriate physical medium as are known in the art, for sending and b) to receive incoming bits of a packet from the physical medium, and to send the incoming bits onward to the on-chip memory 125 in the form of a packet; and a real-time hardware clock 185 (typically a Coordinated Universal Time (UTC) clock, which is kept synchronized to UTC using mechanisms known in the art of time synchronization such as, by way of non-limiting example, precision time protocol (PTP)). Exemplary circuitry for keeping the real-time hardware clock 185 synchronized to UTC using PTP is described below with reference to FIGS. 4 and 5. It is appreciated that another appropriate clock, such as TAI clock, may be used; the example of a UTC clock is not meant to be limiting.

The real-time hardware clock 185 supplies a time signal to the arbitration module 165.

The arbitration module 165 arbitrates when a given packet in the FIFO memory 162 is to be sent onwards to the PHY module 180. Such arbitration may be on the basis of: always prefer a given packet (send a packet when it arrives); always prefer a given packet, according to an applicable specification (such as, for example, an applicable Ethernet specificacation in case of an Ethernet physical medium, which includes rules as to when a packet can be sent); or send a packet at an exact time.

In the case of sending a packet at an exact time, the request to send the packet at the exact time arrives from the arbitration for transmission module 145 via an appropriate connection (shown as new connection 190 in FIG. 1) along with the exact time at which the packet should be sent. The arbitration module 165 then waits to fetch that packet (when that packet is the next packet available in the FIFO memory 162) until the exact time at which the packet should be sent, based on the time signal provided by the real-time hardware clock 185, and then fetches the packet from the FIFO memory 162 and sends the packet via the PHY module 180. It is appreciated that, in general, if the arbitration module waits to fetch such a packet from the FIFO memory 162, then idle data produced by the idle data module 175 will be sent during that waiting time, resulting in less utilization of the physical medium. In other words, the packet which is to be sent at an exact time is "stalled" until that time is reached.

Should a given packet intended to be sent at an exact time arrive at the head of the FIFO memory 162 at or after the exact time, then the packet is fetched by the arbitration module 165 from the FIFO memory 162 and is sent immediately (according to the "always prefer packet" policy, or according to the "always prefer packet according to an applicable specification policy", as explained above).

It is appreciated that, in general, the arbitration for transmission module 145 may be able to estimate how many packets are waiting for transmission starting at the MAC unit 155, since the rate of packets exiting the on-chip memory 125 and the rate of packets exiting the arbitration module 165 are both known, so that the number of packets that are "in process" after the on-chip memory 125 and beginning with the MAC unit 155 can be calculated. Thus, for a packet with an exact time to be sent, an approximate time at which that packet should be scheduled for sending by the arbitration for transmission module 145 can be determined. By sending such a packet at the determined approximate time (and before the exact time), issues with packets that arrive too early at the arbitration unit 165 (and hence cannot be held long enough in the FIFO memory 162 to be sent at the exact time) or that arrive too late at the head of the FIFO memory 162 (and hence will be sent after the exact time) can be reduced.

Figure 2:
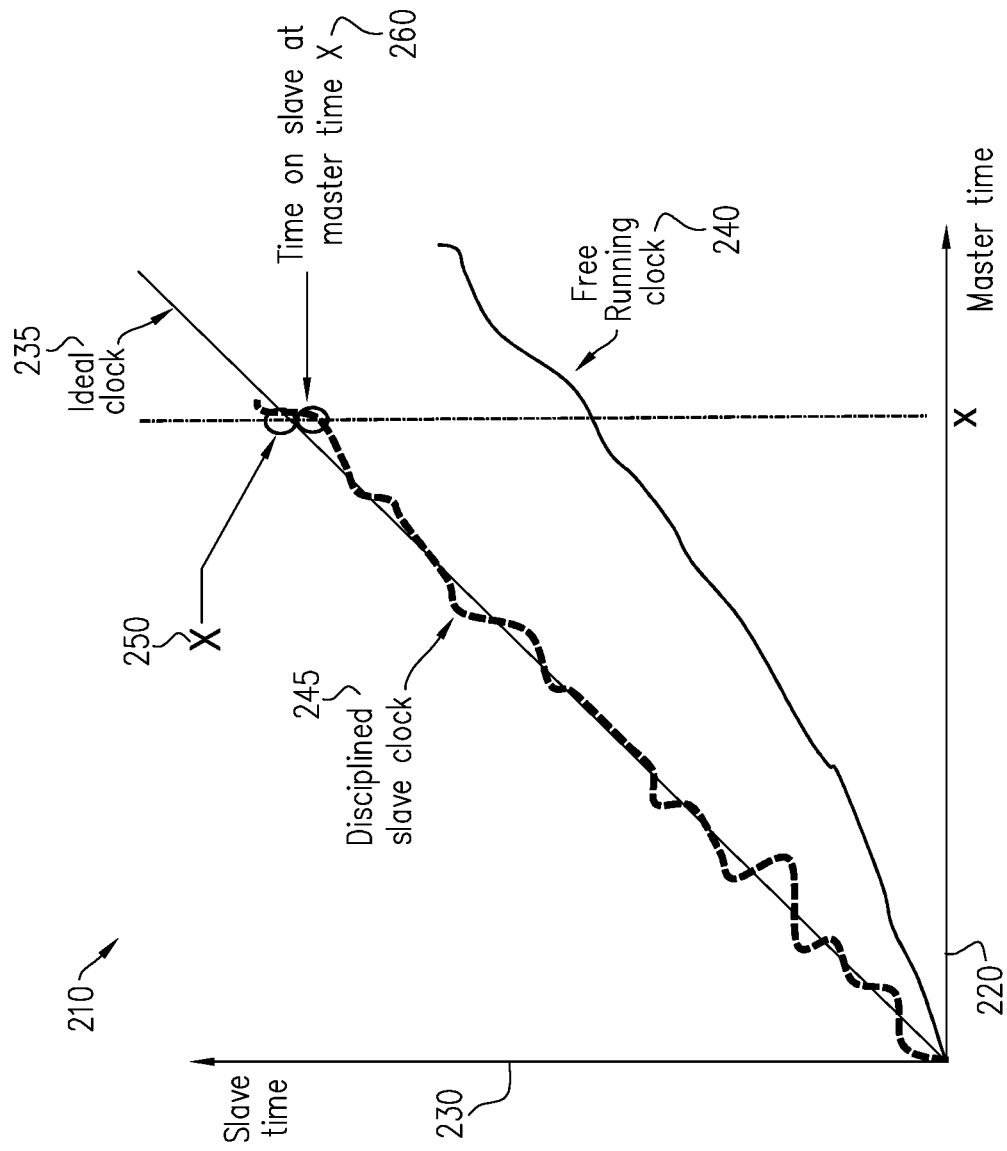
FIGS. 2 and 3 are simplified graphical illustrations, useful for understanding the system of FIG. 1.
Figure 3:
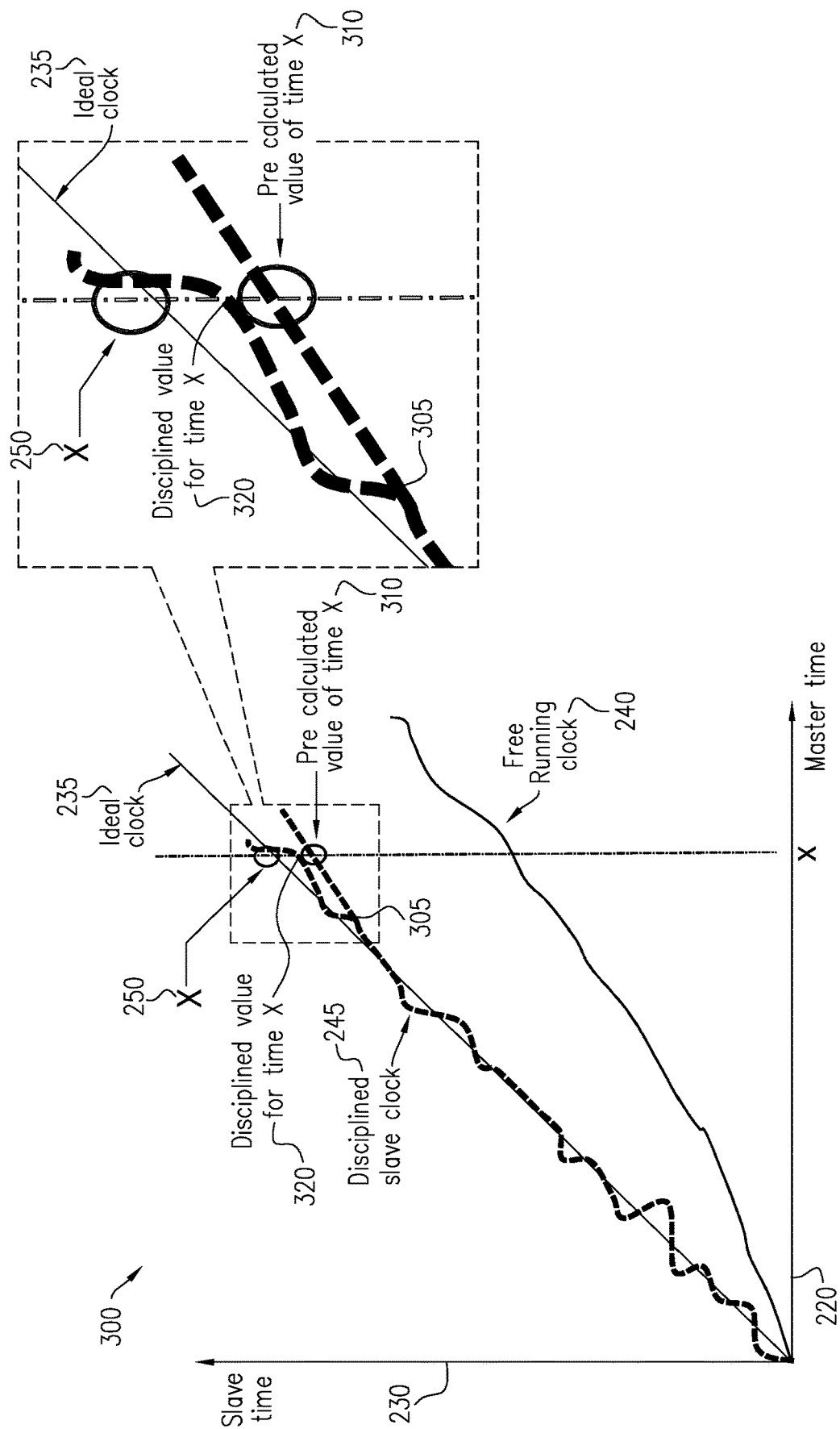

Reference is additionally made to FIGS. 2 and 3, which are simplified graphical illustrations, useful for understanding the system of FIG. 1.

FIG. 2, generally designated 200, comprises a graphical depiction of master clock time 220 on a horizontal access, versus slave clock time 230 on a vertical access. In the case of an ideal clock 235, slave clock time 230 would always be equal to master clock time 220. In the case of a free running clock 240 (a clock which is not corrected according to a master clock), there is considerable drift over time away from ideal clock time 220. In a case of disciplined slave clock time 245, in which a slave clock is periodically corrected according to a master clock (such as would typically be the case for the real time hardware clock 185 of FIG. 1), the slave clock time 245 is a close approximation of the time of an ideal clock 235.

At master time X 250, it will be appreciated that a time on the slave at X 260 is quite close to the ideal time 235 at X.

FIG. 3, generally designated 300, is similar to FIG. 2 and includes similar reference numbers, except as now described.

At a first time 305 a packet and packet descriptor are created for sending, with the packet descriptor indicating that the packet should be sent at time X. Without the mechanism described above with reference to FIG. 1, the packet would be sent at a pre-calculated time 310. The mechanism described above with reference to FIG. 1 allows the packet to be sent more precisely, as indicated by disciplined value for time X 320. It will thus be appreciated that the mechanism of FIG. 1 enables packets to be sent with more precise timing.

It will be appreciated that, for purposes of simplicity of description, the various times depicted in FIGS. 2 and 3 are not necessarily shown to scale, so that, for example, the differences depicted between the various clocks (such as, for example, the difference between the disciplined slave clock 245 and the ideal clock 235) may, in practice, be less than appears in FIGS. 2 and 3.

Figure 4:
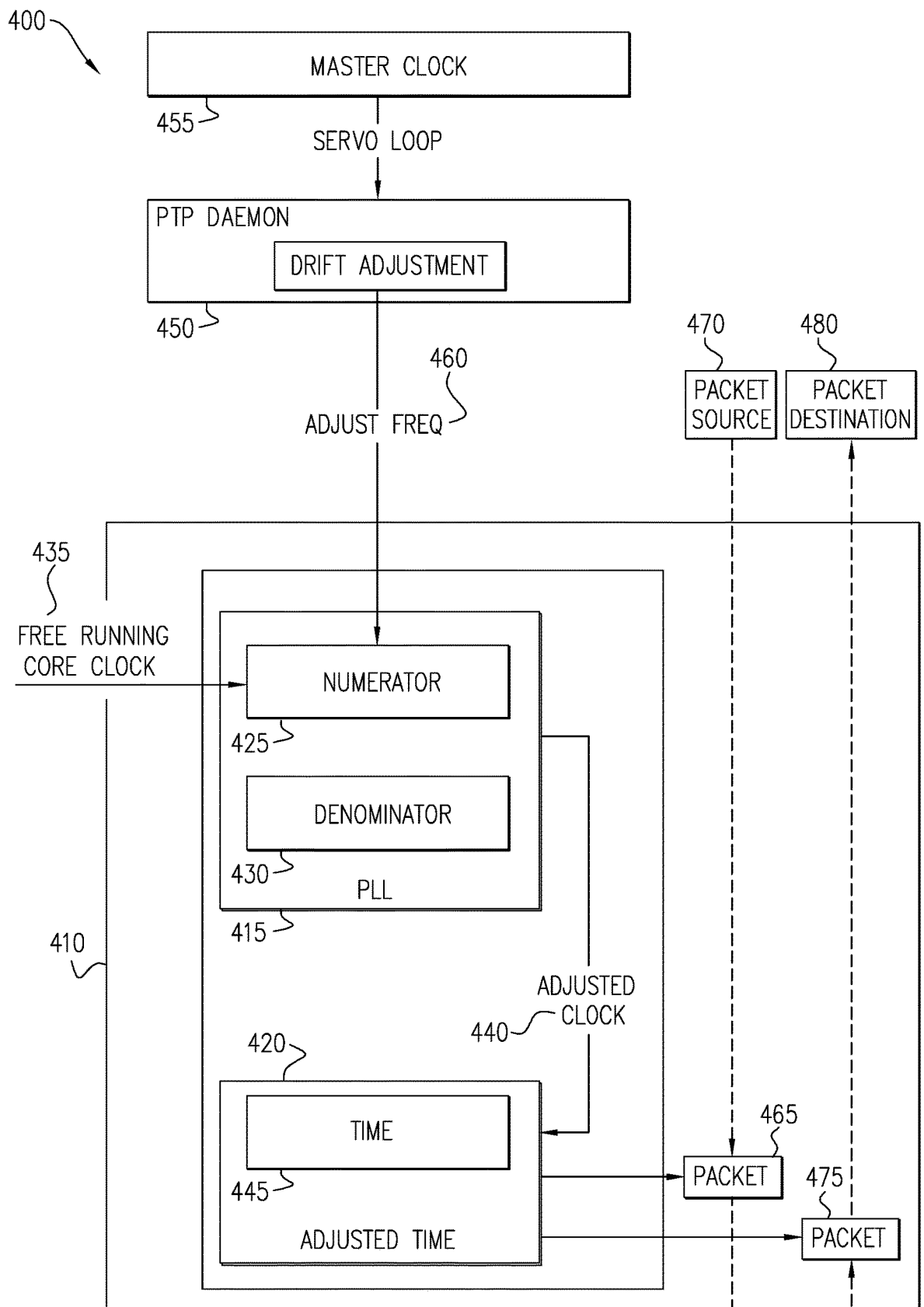
FIGS. 4 and 5 are simplified block diagrams of exemplary embodiments of circuitry for clock adjustment, useful for understanding a portion of the system of FIG. 1.
Figure 5:
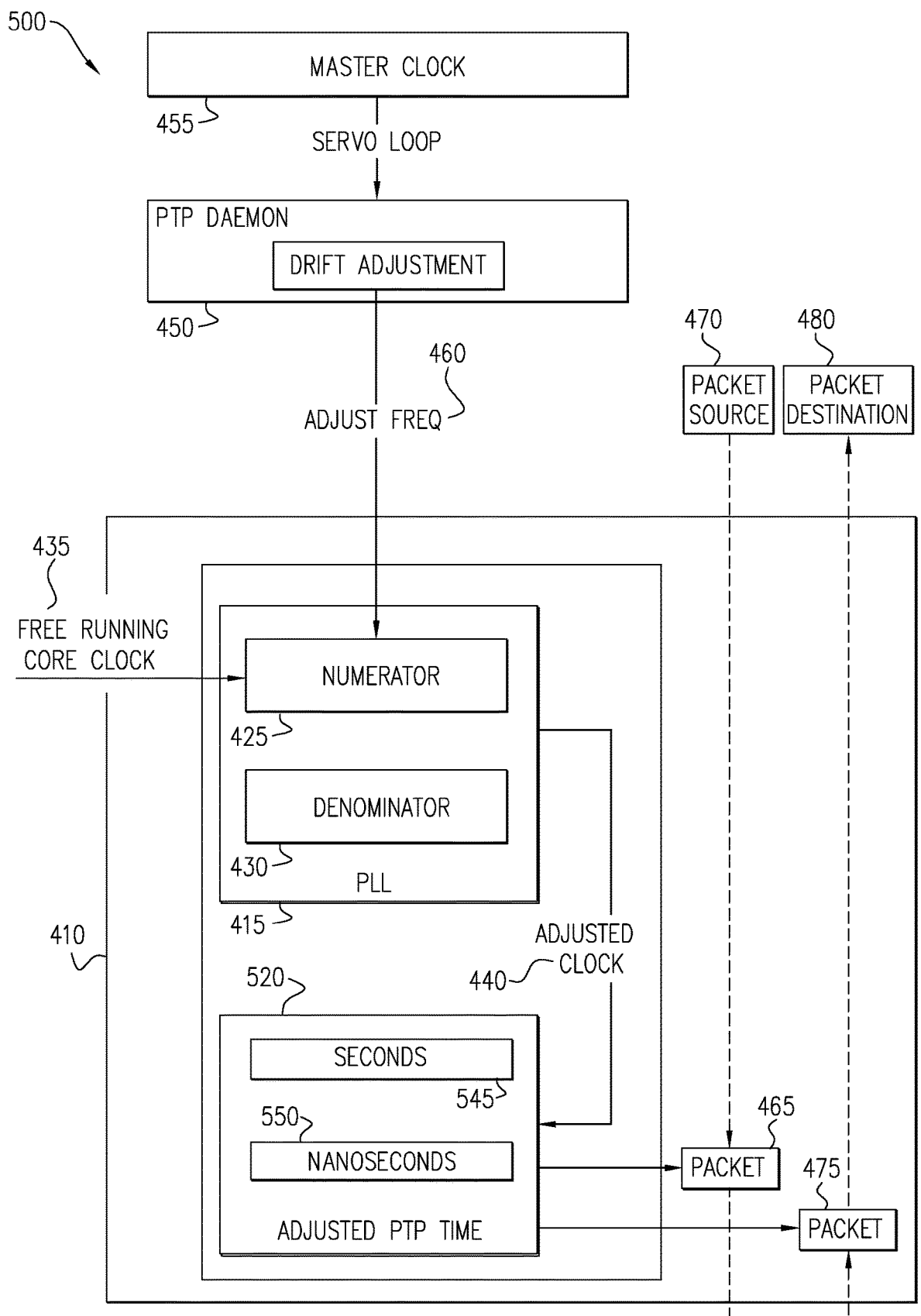

Reference is now made to FIGS. 4 and 5, which are simplified block diagrams of exemplary embodiments of circuitry for clock adjustment, useful for understanding a portion of the system of FIG. 1.

FIG. 4 is a block diagram of an exemplary embodiment of circuitry for clock adjustment, suitable for adjusting the real-time hardware clock 185 of FIG. 1, and showing the interaction of the real time hardware clock of 185 of FIG. 1 with packets entering into and egressing from the system of FIG. 1.

The circuitry of FIG. 4, generally designated 400, comprises a PTP hardware clock module 410, with comprises:
    a phased lock loop (PLL) unit 415;
    and an adjusted time unit 420.

The PLL unit 415, which operates in a manner general similar to that known in the art for PLL units comprises:
    a numerator unit 425; and
    a denominator unit 430.

The PLL unit 415 (specifically the numerator unit 425) receives a free running core clock signal 435, indicating the value of a free running clock (not shown). The PLL unit 415 performs frequency multiplication and division as necessary, for correction of the free running clock time as described below. If the free running clock were not to be corrected, the free running clock would, over time, produce a time such as the free running clock time 240 of FIG. 2.

The circuitry of FIG. 4. also comprises a PTP daemon 450 (which may operate in a manner generally similar to that known in the art for PTP daemons), which is corrected via a servo loop from a master clock 455. In certain exemplary embodiments, the PTP daemon 450 is implemented in software.

The PTP daemon 450 sends frequency adjustment signals 460 to the PLL unit 415, thus keeping the time at the PLL unit 415 closely aligned with the time of the PTP daemon 450, and thus with the time of the master clock 455. The frequency adjustment signals 460 may be sent by the PTP daemon 450 at any appropriate sending rate, which sending rate is typically dependent on a particular implementation of the PTP daemon 450. Without limiting the generality of the foregoing, the sending rate may range between once per second and 128 times per second. Persons skilled in the art will appreciate that the illustrative graphical depictions of FIGS. 2 and 3, discussed above, will look different based on the sending rate of frequency adjustment signals 460 by the PTP daemon 450.

It is appreciated that the servo loop control between the master clock 455 and the PTP daemon 450 may be carried out in accordance with the well-known IEEE 1588 PTP standard, or in any other appropriate manner. Such other appropriate manners may include, by way of non-limiting example: 1PPS; NPPS; NTP; and an appropriate proprietary algorithm. It is further appreciated that sub-combinations of the circuitry of FIG. 4, without the PTP daemon 450 and without the master clock 455, comprise alternate exemplary embodiments of the circuitry of FIG. 4.

Returning to the functioning of the PLL unit 415, the PLL unit 415 sends an adjusted clock 440 (instantiated generally as clock ticks) to a time register 445. It will be appreciated that, as described, the time register 445 holds adjusted time which corresponds to the disciplined slave clock 245 of FIG. 2.

The clock ticks as described above may occur at any appropriate rate, which would be dependent on a particular implementation of the circuitry of FIG. 4. Without limiting the generality of the foregoing, an appropriate rate might be, for example, 250 million or 500 million ticks per second.

In general, each packet 465 ingressing from a packet source 470 to the switch/NIC 110 of FIG. 1 receives a time stamp from the time unit 445. Similarly, each packet 475 egressing to a packet destination 480 from the switch/NIC 110 of FIG. 1 receives a time stamp from the time unit 445. It is appreciated that the packet source 470 and the packet destination 480 are, in general, external both to the circuitry of FIG. 4 and to the system of FIG. 1.

It will be appreciated, in light of the above discussion, that the circuitry of FIG. 4 is useful, in exemplary embodiments of FIG. 1, for aiding in sending packets at a specific time which closely matches a time stamp in those packets.

FIG. 5, generally designated 500, is similar to FIG. 4 and includes similar reference numbers, except as now described.

In the circuitry of FIG. 5 an adjusted PTP time unit 520 comprises a seconds register 545 and a nanoseconds register 550; the adjusted PTP time unit 520 is thus configured to hold time in PTP format, and to use time in that format. As a consequence, work may be offloaded from the PTP daemon 450 because incoming packets, when provided with a time stamp, maybe provided with a PTP time stamp, thus obviating the necessity of requesting (by, for example, an application running on the host processor 105) assistance in translating another time format to PTP time. Furthermore, time stamps are provided to (outgoing) packets by the adjusted PTP time unit 520, such as to packets 465 and 475, in PTP time format, thus enabling better scheduling in accordance with a specific time.

Figure 6:
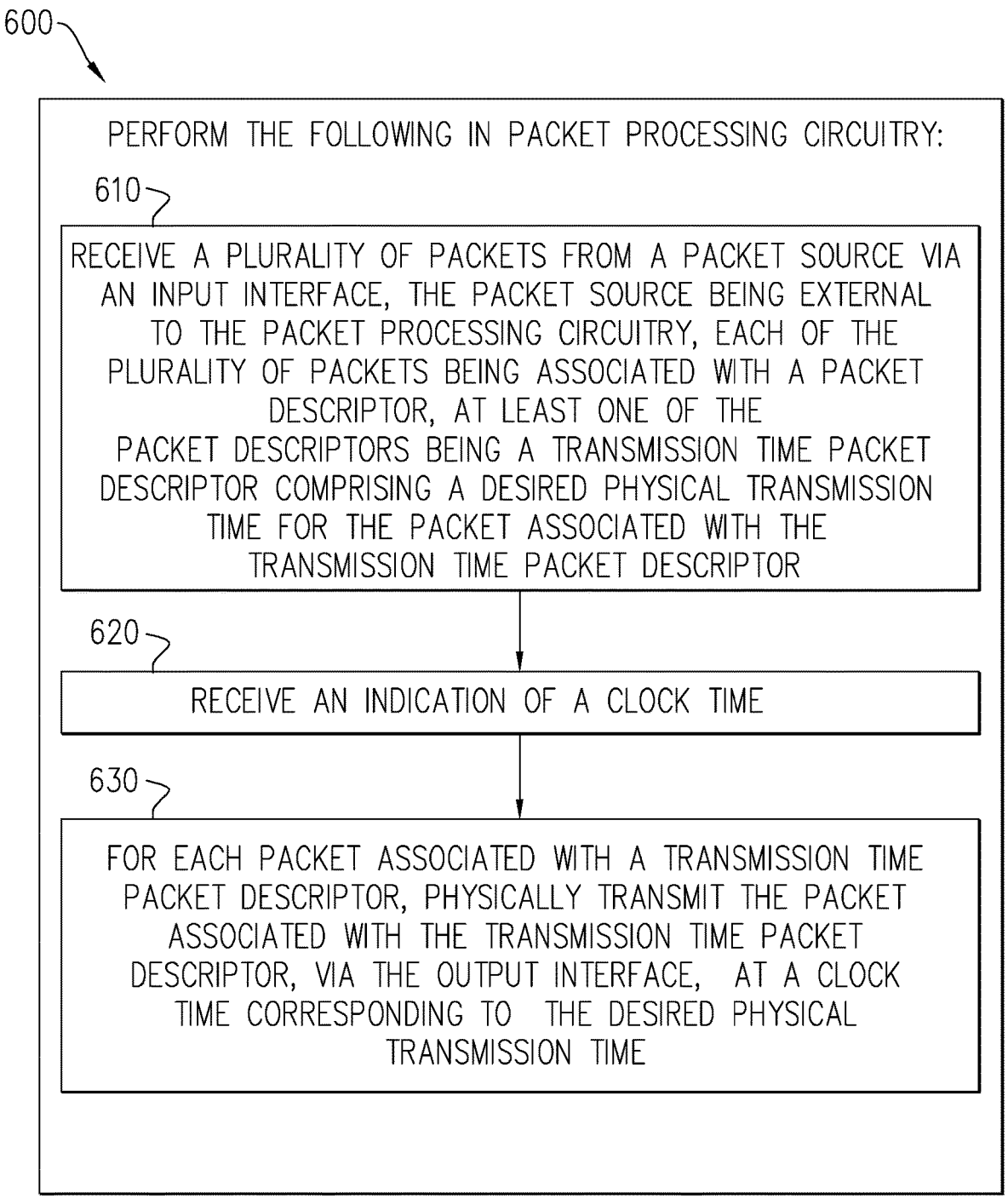
FIG. 6 is a simplified flowchart illustration of an exemplary method of operation of the system of FIG. 1.

Reference is now made to FIG. 6, which is a simplified flowchart illustration of an exemplary method of operation of the system of FIG. 1. The exemplary method of FIG. 6 (generally designated 600) comprises the following steps, which are performed in packet processing circuitry as described above:

In step 610, a plurality of packets is received from a packet source via an input interface. The packet source is external to the packet processing circuitry (although in certain exemplary embodiments, it may be possible for the packet source not to be external). Each of the plurality of packets is associated with a packet descriptor; at least one of the packet descriptors is a transmission time packet descriptor including a desired physical transmission time for the packet associated with the transmission time packet descriptor.

In step 620, an indication of clock time is received. As described above, it is appreciated that in certain exemplary embodiments the indication of clock time may be received from a clock external to the packet processing circuitry, and that the clock external to the packet processing circuitry may be corrected by a master clock (which may be, by way of non-limiting example, a PTP clock as described in more detail above).

In step 630, for each packet associated with a transmission time packet descriptor, that packet is physically transmitted via the output interface, at a clock time corresponding to the desired physical transmission time. Details of how such transmission at the desired physical transmission time may be accomplished, in exemplary embodiments, are described above.

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof:

What is claimed is:

1. A switching device, comprising:
an input interface configured to communicate with a packet source;
an output interface configured to communicate with a packet destination; and
packet processing circuitry including a packet storage memory to store packets received from said packet source and an arbitration module physically located proximate to said packet storage memory and to said output interface, the packet processing circuitry:
to receive a plurality of packets from the packet source via the input interface, each of said plurality of packets being associated with one of a plurality of packet descriptors, at least one of said plurality of packet descriptors being a transmission time packet descriptor comprising a desired physical transmission time for the packet associated with said transmission time packet descriptor;
to receive an indication of a clock time; and
for each packet associated with said at least one transmission time packet descriptor, to hold each packet having said at least one transmission time packet descriptor comprising a desired physical transmission time, after each said packet has previously been received from the input interface, stored in the packet storage memory, and designated for transmission, until the arbitration module receives an indication of clock time corresponding to the desired physical transmission time, the arbitration module then fetching each said packet having a desired physical transmission time corresponding to the indication of clock time from the packet storage memory and passing each said fetched packet on for physical transmission via the output interface, at the clock time corresponding to the desired physical transmission time, wherein the switching device also comprises clock circuitry and master clock circuitry, and:

the clock circuitry is configured to provide one or more indications of clock time to the packet processing circuitry, and the master clock circuitry is configured periodically to correct the time provided by the clock circuitry.

2. The switching device according to claim 1, wherein:
the input interface comprises a host interface, and
the packet source comprises a host, and
the output interface comprises a network interface.

3. The switching device according to claim 1, wherein:
the input interface comprises a first network interface, and
the packet source comprises a network source remote to the switching device, and
the output interface comprises a second network interface.

4. The switching device according to claim 1, and wherein the master clock circuitry comprises a precision time protocol (PTP) clock.

5. The switching device according to claim 4, and wherein the indications of clock time provided by the clock circuitry are provided in PTP time format.

6. The switching device according to claim 1, and wherein at least the input interface, the output interface, and the packet processing circuitry are comprised in a switch.

7. The switching device according to claim 1, and wherein at least the input interface, the output interface, and the packet processing circuitry are comprised in a network adapter.

8. The switching device according to claim 1, and wherein at least the input interface, the output interface, and the packet processing circuitry are comprised in a graphics processing unit.

9. A method for packet scheduling, the method comprising performing the following in packet processing circuitry including a packet storage memory to store package received from a packet source and an arbitration module physically located proximate to said packet storage memory and to an output interface:

receiving a plurality of packets from the packet source via an input interface, the packet source being external to the packet processing circuitry, each of said plurality of packets being associated with one of a plurality of packet descriptors, at least one of said plurality of packet descriptors being a transmission time packet descriptor comprising a desired physical transmission time for the packet associated with said transmission time packet descriptor;

receiving an indication of a clock time; and for each packet associated with said at least one transmission time packet descriptor, holding each packet having a transmission time packet descriptor comprising a desired physical transmission time, after each said packet has previously been received from the input interface, stored in the packet storage memory, and designated for transmission, until the arbitration module receives an indication of clock time corresponding to the desired physical transmission time, the arbitration module then fetching each said packet having a desired physical transmission time corresponding to the indication of clock time from the packet storage memory and passing each said fetched packet on for physical transmission, and then physically transmitting the packet associated with said transmission time packet descriptor, via said output interface, at a transmission clock time corresponding to the desired physical transmission time, wherein the method also comprises:

receiving one or more indications of clock time from clock circuitry external to the packet processing circuitry, and the clock circuitry periodically receives time corrections from master clock circuitry external to the packet processing circuitry.

10. The method according to claim 9, and wherein the master clock circuitry comprises a precision time protocol (PTP) clock.

11. The method according to claim 10, and wherein the indications of time received from the clock circuitry are provide in PTP time format.

12. The method according to claim 9, and wherein the master clock circuitry is external to the clock circuitry.

13. Apparatus comprising:

packet processing circuitry including a packet storage memory to store package received from a packet source and an arbitration module physically located proximate to said packet storage memory and to an output interface, the packet processing circuitry:

to receive a packet from said packet source via an input interface, said packet being associated with a transmission time packet descriptor comprising a desired physical transmission time for the packet associated with said transmission time packet descriptor;

to receive an indication of a clock time; and for the packet associated with said transmission time packet descriptor, to hold the packet having a transmission time packet descriptor comprising a desired physical transmission time, after the packet has previously been received from the input interface, stored in the packet storage memory, and designated for transmission, until the arbitration module receives an indication of clock time corresponding to the desired physical transmission time, the arbitration module then fetching from the packet storage memory the packet having a desired physical transmission time corresponding to the indication of clock time corresponding to the desired physical transmission time and passing the fetched packet on for physical transmission via the output interface, thereby to physically transmit the packet associated with said transmission time packet descriptor at a transmission clock time corresponding to the desired physical transmission time, wherein the apparatus also comprises clock circuitry and master clock circuitry, and:

the clock circuitry is configured to provide one or more indications of clock time to the packet processing circuitry, and the master clock circuitry is configured periodically to correct the time provided by the clock circuitry.

14. The switching device according to claim 1 and wherein said clock circuitry is physically located proximate to said packet processing circuitry.

15. The method according to claim 9 and wherein said clock circuitry is physically located proximate to said packet processing circuitry.

16. Apparatus according to claim 13 and wherein said indication of clock time is received from clock circuitry physically located proximate to said packet processing circuitry.

* * * * *